United States Patent [19]

Axelby et al.

[11] Patent Number: 4,663,703
[45] Date of Patent: May 5, 1987

[54] PREDICTIVE MODEL REFERENCE ADAPTIVE CONTROLLER

[75] Inventors: George S. Axelby, North Linthicum; Vedat Geldiay, Silver Spring; Clinton W. Moulds, III, Millersville, all of Md.

[73] Assignee: Westinghouse Electric Corp., Pittsburgh, Pa.

[21] Appl. No.: 783,286

[22] Filed: Oct. 2, 1985

[51] Int. Cl.$^4$ .................. G05B 13/00; G06F 15/46
[52] U.S. Cl. ................................ 364/149; 364/150; 364/165
[58] Field of Search ............... 364/148, 149, 150, 151, 364/158, 159, 164, 165; 318/615, 616, 617, 618

[56] References Cited

U.S. PATENT DOCUMENTS

| | | | |
|---|---|---|---|
| 3,221,151 | 11/1965 | Cattel | 364/150 |
| 3,221,229 | 11/1965 | Kezer | 318/18 |
| 3,221,230 | 11/1965 | Osburn | 364/150 |
| 4,021,716 | 5/1977 | Rue | 318/648 |
| 4,195,337 | 3/1980 | Bertrand | 318/610 |
| 4,197,576 | 4/1980 | Sanchez | 364/164 |
| 4,358,822 | 11/1982 | Sanchez | 364/164 |
| 4,437,045 | 3/1984 | Mitsuoko | 318/561 |
| 4,495,577 | 1/1985 | Strunk | 364/424 |

OTHER PUBLICATIONS

"Comparative Studies of Model Reference Adaptive Control Systems", Hang and Parks, IEEE Transactions on Automatic Control, vol. AC-18, No. 5, Oct., 1973; pp. 419-428.

"Adaptive Compensation for an Optical Tracking Telescope", Gilbart and Winston, Automatica, vol. 10, Pergamon Press, 1974; pp. 125-131.

Primary Examiner—Jerry Smith
Assistant Examiner—Allen MacDonald
Attorney, Agent, or Firm—W. G. Sutcliff

[57] ABSTRACT

Apparatus and method for controlling the output of a dynamic system which is susceptible to changing dynamic characteristics. The desired present and future outputs of the system are applied to a predictor which determines the inputs to a model reference adaptive control subsystem from which the actual outputs are produced. The predictor uses an impulse model of the subsystem to simulate and predict future outputs. The adaptive control subsystem includes adjustable gain feedback or controlloops which are adjusted to make the dynamic system appear to have constant characteristics even when its dynamic characteristics are changing. A reference model of the dynamic system is used as the basis for the gain adjustments. The equation weights for the mathematical impulse model used by the input predictor are derived from the reference model of the adaptive control subsystem, and remain constant throughout the operation of the controller.

11 Claims, 3 Drawing Figures

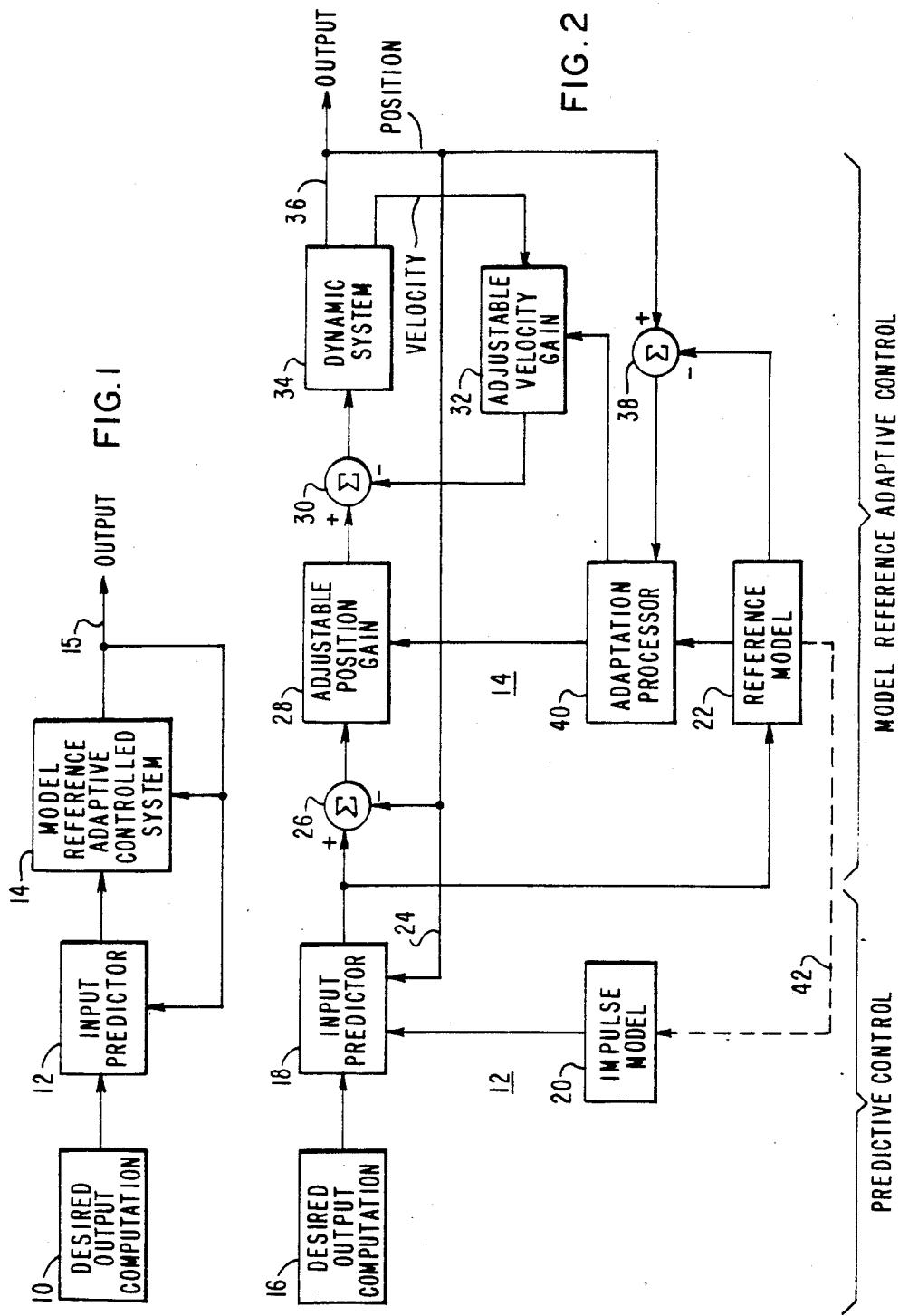

PREDICTIVE MODEL REFERENCE ADAPTIVE CONTROLLER

BACKGROUND OF THE INVENTION

This invention relates, in general, to feedback control systems and, more specifically, to adaptive control systems using mathematical system models.

The control of certain system variables and their derivatives, such as position and velocity, of a dynamic system is required in various applications. Variations in the characteristics of the system being controlled and changes in external conditions complicates the control requirements in many cases. High speed military aircraft, missiles, motor drives, chemical plants, rolling mills, and voltage regulators are a few examples of applications where a system output must be maintained in the presence of changing dynamic characteristics, such as wind, terrain, frequency, voltage, inertia, component aging, loading, and temperature. The present invention describes the automatic generation of the input signals to the controlled system by means of predictive and model reference adaptive control techniques. This combined technique makes the controlled system perform much more accurately and consistently than conventional techniques when the system characteristics vary rapidly and drastically due to external disturbances and changing conditions as the system is operating.

Conventional controllers known in the prior art include predictive controllers and model reference adaptive controllers. Predictive control is a method or system for making the output of the controlled system follow a desired trajectory, or value, with much less following error than is usually possible with simple error feedback control systems. In predictive control, the input to the system is varied according to an impulse, or step, response model of the system in such a manner as to cause the output of both the model and the controlled system to follow the prescribed trajectory. The predictive technique looks into the future to determine what the actual system output will be at some later time. This is accomplished by applying present and future inputs to the impulse model of the system. By use of multi-input, multi-output models, cross coupling between axes or processes can also be greatly reduced with predictive control.

Model reference adaptive control (MRAC) consists of a reference model, chosen at the discretion of the designer, which provides an effective and flexible means of specifying desired closed-loop performance characteristics. The parameters of the controller, or the feedback gains, are adjusted in such a way that the errors between the reference model output and the actual system output are minimized. The objective of MRAC is to force the output of the system and its derivatives to be the same as that of the mathematical reference model. The reference model has dynamic characteristics which do not change as the system operates. The actual controlled system, with its changing characteristics, is forced to attain the unchanging characteristics of the model by means of the adaptive control technique. Background material in MRAC techniques is contained in "Comparative Studies of Model Reference Adaptive Control Systems," by Hang and Parks, IEEE Transactions on Automatic Control, Vol. AC-18, No. 5, October, 1973. However, MRAC systems do not have the capability of following a desired input trajectory with a potentially zero following error.

Conventional predictive controllers use an "identifier" to determine the matchematical relationship of the system impulse response model so that the predictive control technique will work properly when used with systems having dynamic characteristics which change while they are operating. If the system model dynamics exactly match those of the controlled system, the input predictor will provide inputs to the system which cause the system output to follow exactly the desired trajectory without any lag error, provided that the trajectory to be followed does not require the system to exceed its power capabilities. The identifier requires a certain amount of computational time to update the model weights. In general, higher processing speeds of the controller result in better following accuracy of the desired trajectory, and in less likelihood of undesirable instability which can be induced by the computational time delays inherent in the use of an identifier.

Determining the proper inputs to the dynamic system being controlled as quickly, accurately, and efficiently as possible is the main objective of this and most trajectory controllers. Therefore, it is desirable, and it is an object of this invention, to provide a controller which exhibits the advantages of both predictive and model references adaptive controllers without some of the undesirable characteristics of either system operating independently.

SUMMARY OF THE INVENTION

There is disclosed herein a new and useful trajectory controller which uniquely combines predictive and model reference adaptive control techniques to provide essentially unchanging overall dynamic characteristics although the original, unadapted system dynamic characteristics may change considerably during normal operation. The unchanging dynamic characteristics provided by the model reference adaptive control portion of the invention result in a highly stable and reliable system, and performs more efficiently than a predictive system with an identifier since such a system is not capable of making the effective system dynamic characteristics appear to be unchanging and consistent. In addition, the amount of processing or computational time required for the disclosed model reference adaptive control technique is less than the processing time required by conventional predictors, thus further increasing the performance and reliability.

The controller of this invention includes a device, such as a circuit or processor algorithm, for providing signals representing the desired system output trajectory, path, or values. These signals are applied to an input predictor which uses an impulse model to determine present and future inputs to an adaptive control portion of the controller. Since the adaptive control portion or subsystem does not exhibit changing dynamic characteristics, the weights or constants used in the mathematical impulse model are fixed, thereby eliminating the need for an identifier and the computational time associated therewith for continuously updating the identifier weights.

The model reference adaptive subsystem of the controller includes adjustable gain feedback loops around the basic system driven by the controller. These feedback loops, in general, feed back the system output and its derivatives, such as position, velocity, and acceleration. The gains of these loops are controlled by an adaptable gain processor primarily based upon the trajectory error existing between the actual system output and the output of a reference model of the adapted system. The weights of the reference model in the MRAC also determine the constants for the impulse model used by the input predictor.

DESCRIPTION OF THE DRAWINGS

Further advantages and uses of this invention will become more apparent when considered in view of the following detailed description and drawings, in which:

FIG. 1 is a block diagram illustrating the general concept of the invention;

FIG. 2 is a detailed block diagram of the invention; and

DESCRIPTION OF THE PREFERRED EMBODIMENTS

Figure 3:
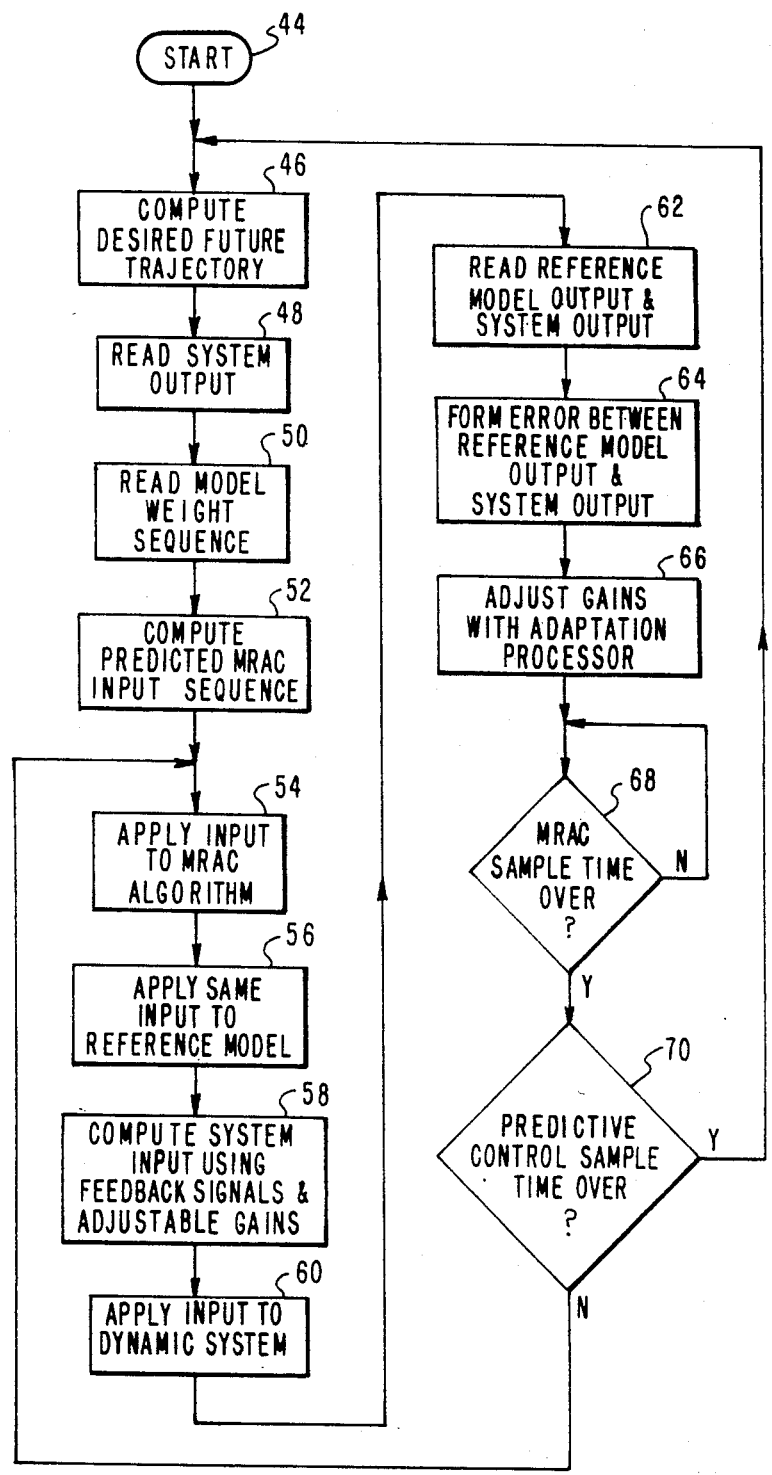
FIG. 3 is a flowchart of a program which may be used to implement the invention by software.

Referring to the drawings, and to FIG. 1 in particular, there is shown a block diagram which illustrates the general concept of the invention. The desired output computation system 10 provides signals proportional to the desired output wanted from the dynamic system being controlled. In a control system operated by computer programs, the desired output signal could be digital values corresponding to the digital values of the desired output. The desired output signals may be generated simultaneously with their output from the computation system 10, or may be stored in memory and outputted by addressing sequential slots of memory and reading the data in these memory slots.

The desired output signal or values are applied to the input predictor 12 which uses, along with other quantities, the desired output values to determine the input which must be applied to the model reference adaptive control system 14 to provide an actual output 15 equal to the desired output. Both the input predictor 12 and the model reference adaptive control system 14 utilize information from the actual output 15 to perform their respective functions. Briefly, as is well known in the prior art, an input predictor determines the present and future values which must be applied to the system being controlled to make the output of that system equal to the desired output. In the present invention, the inputs predicted by the input predictor 12 are not applied directly to the dynamic system being controlled, but to the model reference adaptive control system 14 which provides further control of the output of the dynamic system. As is also well known in the prior art, a model reference adaptive control system adjusts or controls the feedback gains of the controlled dynamic system so that the controlled system exhibits the same characteristics as a reference model of the system contained in the adaptive control system. The combination of the input predictor 12 and the model reference adaptive control system 14 provides enhanced performance over prior art systems, and permits an advantageous interrelationship between the mathematical system models used by the predictor and the adaptive control system.

FIG. 2 is a block diagram showing, in more detail, the functions of the input predictor 12 and the model reference adaptive control system 14, which are generally shown in FIG. 1. Analog signals or digital values from the desired output computation device 16 are applied to the input predictor 18, which makes use of the impulse model 20. As will be described in more detail later herein, the mathematical constants or weights of the impulse model 20 are derived from the mathematical relationships known to exist for the reference model 22, as indicated by dotted line 42. Output sample line 24 is applied to the input predictor 18 to provide the reset function used by input predictors in accurately predicting the signals or values which must be inputted to the following system to give the desired output.

According to this invention, the inputs provided by the input predictor 18 are applied to both the reference model 22 and to an adder 26. The adder 26 combines the input signals and the feedback loop or sample line 24 from the output of the dynamic system 34 to provide a difference signal which is applied to the adjustable position gain stage 28. The output of the adjustable position gain stage 28 is applied to adder 30 along with a feedback signal from the adjustable velocity gain stage 32 to form the final input to the dynamic system 34. Although described in terms of position and velocity, the adjustable gain stages 28 and 32 would also be used in systems where the output has other physical characteristics, such as voltage values, or temperature values. Stage 28 pertains to the position or closeness of the actual output to the desired output, and stage 32 pertains to the velocity or rate at which the output is changing. FIG. 2 shows adjustable gains for the position and velocity feedback loops. However, adjustable gains can be used for feedback loops from any output, and its derivatives. Normal practice uses only the first derivative of the output.

The system output 36 is applied to the adder 38 along with the output signal from the reference model 22. The outputs include the necessary output derivative, the errors of which are needed by the adaptation processor 40. The difference signal from the adder 38 is applied to the adaptation processor 40 which sends control signals to the adjustable position gain stage 28 and to the adjustable velocity gain stage 32. During the operation of the control system, the input signal to the model reference adaptive control system 14 from the input predictor 18 is applied both to the reference model 22 and to the adaptable feedback system, beginning with adder 26. The reference model, which has been previously determined, produces an output which is applied to adder 38. This output does not change when the dynamic characteristics of the dynamic system 34 change. Such changes can occur when system disturbances, such as wind, frequency, voltage, and other external or internal quantities, change during the operation or movement of the system. Therefore, since the output from the reference model 22 does not change, it is considered a reference by which the other portion of the system is to be compared.

Assuming that the dynamic characteristics of the dynamic system 34 are susceptible to change, the output 36, disregarding for the moment the adjustable gain stages, would depart from the desired output when the inputs are applied to the adder 26. However, since the output is compared by adder 38, to the reference model 22 output, and any error signal is applied to the adaptation processor 40 for reducing the error to zero by controlling the adjustable stages, the output 36 of the dynamic system takes the form of the output from the reference model 22. Consequently, the adaptation procedures followed by the adaptive control portion or subsystem of the invention provide a feedback system which exhibits the same dynamic characteristics even though the dynamic system being controlled may exhibit changing dynamic characteristics.

Since the reference model 22 is merely a mathematical representation of the dynamic system 34 when its dynamic characteristics are not being changed, the relationships and constants in the mathematical equations are fixed. The reference model 22 is a linear, uncoupled model of the dynamic system 34 with position and velocity feedback. Since there is a direct correlation between the reference model 22 and the impulse model 20 which is used by the input predictor 18, the weights or constants used by the impulse model 20 may be derived simply from the reference model 22, as indicated by dotted line 42. Since these are values which do not change during the operation of the system, the computations and derivations of model weights may be done prior to, or off-line from, the normal operation of the system.

For the above reasons, it is not necessary to compute or calculate the model weights during the operation of the system, as is required in some prior art input predictors which have "identifier" mechanisms built into the predictor to determine the model weights of the impulse model as the system is operating. In prior art systems which included input predictors with identifiers, the identifier was required to update the impulse model weights continuously during the operation of the system to take into account the changes in the dynamic characteristics of the system being controlled. However, since, according to this invention, the input predictor is working into a system which does not appear as having changing dynamic characteristics, the identifier is not needed and the weights from the impulse model can be calculated ahead of time. This conserves and reduces valuable computation time and permits the controller of this invention to make updated input predictions more frequently than prior art control systems. Eliminating the use of the identifier is especially beneficial when the dynamics characteristics of the controlled system change drastically during normal operation, characterized by becoming oscillatory in some phases of system operation, but not in other phases, perhaps due to changes from minimum phase to non-minimum phase system characteristics. When the dynamic characteristics are changing drastically and rapidly, the identifier cannot update the system model often enough, thereby introducing unacceptable mismatch errors in the system performance.

Another advantage of the invention due to the elimination of the on-line system identifier is that there is no need to use a test signal to persistently excite the input to the identifier, as well as to the controlled system, to excite all the significant system modes so as to obtain a model that is not influenced by the input frequency spectrum. Usually, this additional input consists of a pseudo-random binary sequence with varying amplitudes or pulse widths having alternate opposite signs. For a certain application, the effect of this additional signal may be unimportant or acceptable, but for others it may be totally undesirable to continuously perturb the controlled system. Therefore, not to have this signal at all is more advantageous than having it for certain applications and not having it for others.

FIG. 3 is a flowchart indicating steps which would be performed in a software implementation of the circuit shown in FIG. 2. The description of the flowchart of FIG. 3 will refer to the element or device of FIG. 2 which provides the same function. The software implementation starts at block 44 in FIG. 3 and proceeds to block 46 which computes the desired future trajectory, similar to block 16 in FIG. 2. Next, the system output is read, as indicated by block 48, and the model weight sequence is read, as indicated by block 50. Both of these inputs to the input predictor are used to compute the predicted model reference adaptive control input sequence, as indicated in block 52. The input is applied to the MRAC system or algorithm, as indicated by block 54, and also to the reference model, as indicated by block 56. In FIG. 2, this corresponds to the inputs to the adder 26 and to the reference model 22.

The input to the adder 26 is modified by the system output, its derivative, and the adjustable gain stages to arrive at the actual input to the dynamic system being controlled, as indicated by blocks 58 and 60 of FIG. 3. The output from the dynamic system, including derivative as required, is compared with the output of the reference model to form an error signal, as indicated by blocks 62 and 64. This function is performed in FIG. 2 by adder 38. Next, the error signal is applied to the adaptation processor 40, shown in FIG. 2, which controls the gains of the adjustable gain stages, as indicated by block 66 shown in FIG. 3.

The software routine shown in FIG. 3 continues to block 68 which makes a determination whether the sample time required by the model reference adaptive control system has been completed. If not, the program loops back through block 68 until the sample time has finished, at which point the program execution proceeds to block 70. Block 70 determines whether the sample time required by the predictive control, or input predictor, portion of the system has finished. If not, the program loops back to block 54 for another pass through the remaining portion of the program. When the sample time has finished for the input predictor, the program returns to block 46 to start the complete process over again.

It is emphasized that the two models used by the control system, that is, the impulse model 20 and the reference model 22 both shown in FIG. 2, have the same dynamic characteristics. However, they do not have the same form. The MRAC reference model 22 is written in a differential or differential equation format. The input predictor system model, or impulse model 20, is stored in computer memory as a sequence of numerical values which represent the system response to an impulse signal applied to its input.

The predictive model reference adaptive control system of this invention provides an improvement in performance over prior art systems when the dynamic system being controlled has widely and drastically changing dynamic characteristics. Because of the unique combination of predictive and model reference adaptive control, as disclosed herein, the input predictor does not require the use of an identifier for updating the weights of the impulse model. Consequently, computational time during operation of the control system is minimized and this speeding up of the operation of the control system provides less likelihood of undesirable instability which can be induced by computational time delays inherent in systems requiring model identifiers.

Since different embodiments of the invention may be made without departing from the scope of the invention, it is intended that all of the matter contained in the foregoing description, or shown in the accompanying drawings, shall be interpreted as illustrative rather than limiting.

We claim as our invention:

1. An arrangement for controlling the output of a dynamic system, said arrangement comprising:
   means for providing signals proportional to the desired output of the dynamic system;
   an adaptive control subsystem for controlling the output of the dynamic system based upon a reference model;
   an impulse model having constants derived from said reference model; and
   an input predictor which uses said impulse model to predict inputs for said subsystem which will provide a dynamic system output similar to the output available from the providing means.

2. The controlling arrangement of claim 1 wherein the reference model represents the response of the dynamic system when its dynamic characteristics do not change.

3. The controlling arrangement of claim 1 wherein the adaptive control subsystem presents fixed and known response characteristics to the inputs from the predictor.

4. The controlling arrangement of claim 1 wherein the inputs to the adaptive control subsystem from the predictor cause a known response at the output of the subsystem even upon drastic changes in the dynamic characteristics of the controlled dynamic system.

5. The controlling arrangement of claim 1 wherein the signal providing means produces signals representative of the present and future desired output of the dynamic system.

6. The controlling arrangement of claim 1 wherein the adaptive control subsystem varies the gain of output position and output derived velocity control loops driving the dynamic system.

7. The controlling arrangement of claim 1 wherein the adaptive control subsystem responds to a difference signal between the output of the reference model and the output of the dynamic system.

8. The controlling arrangement of claim 1 wherein the constants of the impulse model are predetermined from reference model weights and remain the same during the operation of the controlling arrangement.

9. The controlling arrangement of claim 1 wherein the input predictor analyzes simulated future outputs of the dynamic system in producing the present input to the adaptive control subsystem.

10. An arrangement for controlling the output of a dynamic system, said arrangement comprising:
    means for providing signals representing the desired present and future outputs of the dynamic system;
    a reference model based upon the unchanging characteristics of the dynamic system;
    adaptive means for maintaining the characteristics of the dynamic system equal to the characteristics of the reference model under changing conditions;
    an impulse model with weights derived from said reference model; and
    an input predictor which uses said impulse model to determine the present input to the adaptive means which is calculated to yield the closest match between a desired future output and a future output predicted by use of the impulse model.

11. A method for controlling the output of a dynamic system, said method comprising the steps of:
    determining the weights of an impulse response model from a reference model used by a model reference adaptive control subsystem;
    providing signals proportional to the desired present and future outputs of the dynamic system;
    predicting future outputs of the subsystem by use of said impulse model;
    comparing the predicted future outputs of the subsystem with the desired future outputs; and
    applying a present input to the subsystem which gives the closest match between said desired and predicted future outputs.

* * * * *